US009225269B2

(12) United States Patent
Hashimoto

(10) Patent No.: US 9,225,269 B2
(45) Date of Patent: Dec. 29, 2015

(54) VEHICLE AND METHOD FOR CONTROLLING VEHICLE

(75) Inventor: Keita Hashimoto, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 93 days.

(21) Appl. No.: 14/232,952

(22) PCT Filed: Aug. 8, 2011

(86) PCT No.: PCT/JP2011/068044
§ 371 (c)(1),
(2), (4) Date: Jan. 15, 2014

(87) PCT Pub. No.: WO2013/021445
PCT Pub. Date: Feb. 14, 2013

(65) Prior Publication Data
US 2014/0125260 A1    May 8, 2014

(51) Int. Cl.
*H02P 3/12*    (2006.01)
*H02P 3/22*    (2006.01)
*B60L 15/20*    (2006.01)
(Continued)

(52) U.S. Cl.
CPC .............. *H02P 3/22* (2013.01); *B60L 3/0007* (2013.01); *B60L 3/0069* (2013.01); *B60L 3/04* (2013.01); *B60L 7/22* (2013.01); *B60L 11/126* (2013.01); *B60L 11/14* (2013.01); *B60L 15/2009* (2013.01); *B60L 2240/421* (2013.01); *Y02T 10/6217* (2013.01); *Y02T 10/642* (2013.01); *Y02T 10/7077* (2013.01); *Y02T 10/7275* (2013.01); *Y10S 903/947* (2013.01)

(58) Field of Classification Search
CPC ... H01M 10/48; H01M 2200/00; H01M 2/34; H02H 3/05; H02H 3/14; H02H 7/06; H02H 7/1255; H02H 9/001; H02P 23/06; H02P 3/14; H02P 3/18; H02P 5/74; H02P 6/085; Y10T 307/516; Y10T 307/885
USPC ................. 318/362, 370, 371, 375, 376, 380, 318/400.21, 400.22
See application file for complete search history.

(56) References Cited

U.S. PATENT DOCUMENTS 3,728,599 A * 4/1973 Minami ........................ 318/139
3,871,472 A * 3/1975 Hosaka et al. ................ 280/735
(Continued)

FOREIGN PATENT DOCUMENTS

| JP | 2005-20952 A | 1/2005 |
| JP | 2010-93934 A | 4/2010 |
| JP | 2011-10406 A | 1/2011 |

*Primary Examiner* — Paul Ip
(74) *Attorney, Agent, or Firm* — Sughrue Mion, PLLC

(57) ABSTRACT

A vehicle includes an engine, an EHC (electrical heated catalyst), a first MG (motor generator) generating a counter electromotive force at the time of vehicle collision, a battery, a PCU (power control unit) having a converter and an inverter performing power conversion between the battery and the first MG, and an ECU. The PCU is connected to the battery through an SMR (system main relay). The EHC is connected between the converter and the inverter through EHC relay. The ECU determines whether or not vehicle collision has occurred. When the vehicle collision has occurred, the ECU opens the SMR to electrically separate the battery and the PCU and closes the EHC relay to electrically connect the EHC and the first MG, so that the counter electromotive force generated in the first MG at the time of vehicle collision is consumed at the EHC.

7 Claims, 5 Drawing Sheets

(51) Int. Cl.

| | | |
|---|---|---|
| *B60L 3/00* | (2006.01) | |
| *B60L 3/04* | (2006.01) | |
| *B60L 7/22* | (2006.01) | |
| *B60L 11/12* | (2006.01) | |
| *B60L 11/14* | (2006.01) | |

(56) References Cited

U.S. PATENT DOCUMENTS

| | | | |
|---|---|---|---|
| 5,162,707 A * | 11/1992 | Joseph | 318/60 |
| 5,170,105 A * | 12/1992 | Kumar | 318/362 |
| 5,245,294 A * | 9/1993 | Kumar | 324/677 |
| 5,280,223 A * | 1/1994 | Grabowski et al. | 318/139 |
| 5,283,507 A * | 2/1994 | Stitt et al. | 318/376 |
| 5,289,100 A * | 2/1994 | Joseph | 318/799 |
| 5,323,095 A * | 6/1994 | Kumar | 318/376 |
| 5,331,261 A * | 7/1994 | Brown et al. | 318/376 |
| 5,373,219 A * | 12/1994 | Grabowski et al. | 318/139 |
| 5,396,214 A * | 3/1995 | Kumar | 338/279 |
| 5,432,413 A * | 7/1995 | Duke et al. | 318/139 |
| 5,621,326 A * | 4/1997 | Watanabe et al. | 324/502 |
| 5,710,699 A * | 1/1998 | King et al. | 363/132 |
| 5,892,342 A * | 4/1999 | Friedlander et al. | 318/434 |
| 5,992,950 A * | 11/1999 | Kumar et al. | 303/151 |
| 6,043,996 A * | 3/2000 | Kumar | 363/41 |
| 6,362,539 B1 * | 3/2002 | Schumacher et al. | 307/10.1 |
| 6,448,784 B1 * | 9/2002 | Belau et al. | 324/548 |
| 6,591,758 B2 * | 7/2003 | Kumar | 105/35 |
| 6,973,880 B2 * | 12/2005 | Kumar | 105/35 |
| 7,185,591 B2 * | 3/2007 | Kumar et al. | 105/35 |
| 7,422,293 B2 * | 9/2008 | Chorian et al. | 303/20 |
| 2002/0057542 A1 * | 5/2002 | Colling | 361/52 |
| 2004/0251691 A1 * | 12/2004 | King et al. | 290/40 C |
| 2005/0005814 A1 * | 1/2005 | Kumar et al. | 105/35 |
| 2005/0024002 A1 * | 2/2005 | Jackson | 318/375 |
| 2005/0040780 A1 * | 2/2005 | Jackson | 318/380 |
| 2006/0125319 A1 * | 6/2006 | King et al. | 307/10.1 |
| 2007/0026711 A1 * | 2/2007 | Chorian et al. | 439/174 |
| 2007/0144398 A1 * | 6/2007 | Kumar et al. | 105/50 |
| 2007/0145918 A1 * | 6/2007 | Kumar et al. | 318/139 |
| 2009/0143933 A1 * | 6/2009 | Kawaura et al. | 701/29 |
| 2009/0159349 A1 * | 6/2009 | Ebuchi et al. | 180/65.235 |
| 2010/0045104 A1 * | 2/2010 | Hirasawa | 307/9.1 |
| 2010/0214055 A1 * | 8/2010 | Fuji et al. | 340/3.1 |
| 2010/0274427 A1 * | 10/2010 | Ebuchi et al. | 701/22 |
| 2011/0050136 A1 * | 3/2011 | Sumi et al. | 318/400.3 |
| 2011/0093148 A1 * | 4/2011 | Kuehner et al. | 701/22 |
| 2011/0221370 A1 * | 9/2011 | Fukuta et al. | 318/400.27 |
| 2011/0278918 A1 * | 11/2011 | Shindo et al. | 307/9.1 |
| 2012/0039100 A1 * | 2/2012 | Hirose | 363/50 |
| 2012/0063044 A1 * | 3/2012 | Fukuyama et al. | 361/62 |
| 2013/0039108 A1 * | 2/2013 | Watanabe et al. | 363/131 |

\* cited by examiner

VEHICLE AND METHOD FOR CONTROLLING VEHICLE

CROSS REFERENCE TO RELATED APPLICATIONS

This application is a National Stage of International Application No. PCT/JP2011/068044 filed Aug. 8, 2011, the contents of which are incorporated herein by reference in their entirety.

TECHNICAL FIELD

The present invention relates to a technology of promptly consuming power generated in a vehicle at the time of vehicle collision.

BACKGROUND ART

A vehicle running by driving a running motor with power of a high-voltage battery generally has a control system which shuts off the high-voltage battery from other equipment by opening a system relay at the time of vehicle collision. However, even after shutting off the high-voltage battery, power (electric load) remains in a capacitor or the like provided in a power control unit including an inverter, a converter, and the like. Therefore, delayed discharging of the power remaining in the capacitor may cause leakage of electricity.

In view of such a problem, Japanese Patent Laying-Open No. 2010-93934 (PTD 1) discloses a technology of allowing an air-conditioning motor to consume power remaining in a capacitor of an inverter at the time of vehicle collision.

CITATION LIST

Patent Document

PTD 1: Japanese Patent Laying-Open No. 2010-93934
PTD 2: Japanese Patent Laying-Open No. 2011-10406
PTD 3: Japanese Patent Laying-Open No. 2005-20952

SUMMARY OF INVENTION

Technical Problem

Depending on a relation of connection between a running motor and wheels, reduction of a rotational speed of wheels (vehicle speed) at the time of vehicle collision may force the running motor to rotate, causing a relatively great counter electromotive force to be generated in the running motor. However, the technology disclosed in PTD 1 is merely a technology of consuming relatively small power remaining in a capacitor of an inverter at the time of vehicle collision, thus it cannot promptly consume a relatively great counter electromotive force generated in the running motor at the time of vehicle collision. In other words, if the counter electromotive force generated in the running motor at the time of vehicle collision is consumed with use of the air-conditioning motor as disclosed in PTD 1, the counter electromotive force generated in the running motor cannot be consumed promptly since it takes a considerable amount of time to raise the rotational speed of the air-conditioning motor to the rotational speed enabling consumption of the counter electromotive force generated in the running motor.

The present invention was achieved to solve the problem described above, and its object is to promptly consume a counter electromotive force generated in a rotational electric machine at the time of vehicle collision.

Solution to Problem

A vehicle according to the present invention includes an electric resistor converting electric energy into heat energy, a rotational electric machine generating a counter electromotive force with rotation caused by reduction of a rotational speed of wheels at a time of vehicle collision, a switching device including a switching circuit switching an electric connection state between the electric resistor and the rotational electric machine, and a control device controlling the switching circuit. The control device controls the switching circuit at the time of vehicle collision to electrically connect the electric resistor and the rotational electric machine to allow the electric resistor to consume the counter electromotive force generated in the rotational electric machine at the time of vehicle collision.

Preferably, the vehicle further includes an engine, an electrical storage device storing power for driving the rotational electric machine, a converter performing voltage conversion between the electrical storage device and the rotational electric machine, and an inverter performing power conversion between the converter and the rotational electric machine. The electric resistor is an electrically heatable catalyst device connected on a power line coupling the converter and the inverter to purify exhaust gas of the engine.

Preferably, when an accumulated value of consumed power of the catalyst device exceeds a threshold value after the rotational electric machine and the catalyst device are electrically connected, the control device controls the switching device to electrically disconnect the rotational electric machine and the catalyst device.

Preferably, when no electric leakage is present on an energizing path coupling the catalyst device and the rotational electric machine at the time of vehicle collision, the control device controls the switching circuit to electrically connect the rotational electric machine and the catalyst device.

Preferably, the switching device includes at its inside a backup power supply storing operation power for the switching circuit.

Preferably, the vehicle further includes a first motor generator, a second motor generator rotating in conjunction with the wheels, and a planetary gear device. The planetary gear device includes a sun gear, a ring gear coupled to the second motor generator, a pinion gear engaged with the sun gear and the ring gear, and a carrier coupled to the engine and rotatably supporting the pinion gear. The rotational electric machine is the first motor generator.

A method for controlling a vehicle according to another aspect of the present invention is a method for controlling a vehicle including an electric resistor consuming power, a rotational electric machine rotated by torque transmitted from wheels at the time of vehicle collision to generate a counter electromotive force, a switching device including a switching circuit switching an electrical connection state between the electric resistor and the rotational electric machine, and a control device controlling the switching circuit, and the method includes the steps of determining whether or not vehicle collision has occurred, and allowing the electric resistor to consume a counter electromotive force generated in the rotational electric machine at the time of vehicle collision by controlling the switching circuit to electrically connect the electric resistor and the rotational electric machine when determined that vehicle collision has occurred.

Advantageous Effects of Invention

According to the present invention, a counter electromotive force generated in a rotational electric machine at the time of vehicle collision can be consumed promptly.

DESCRIPTION OF EMBODIMENT

Figure 1:
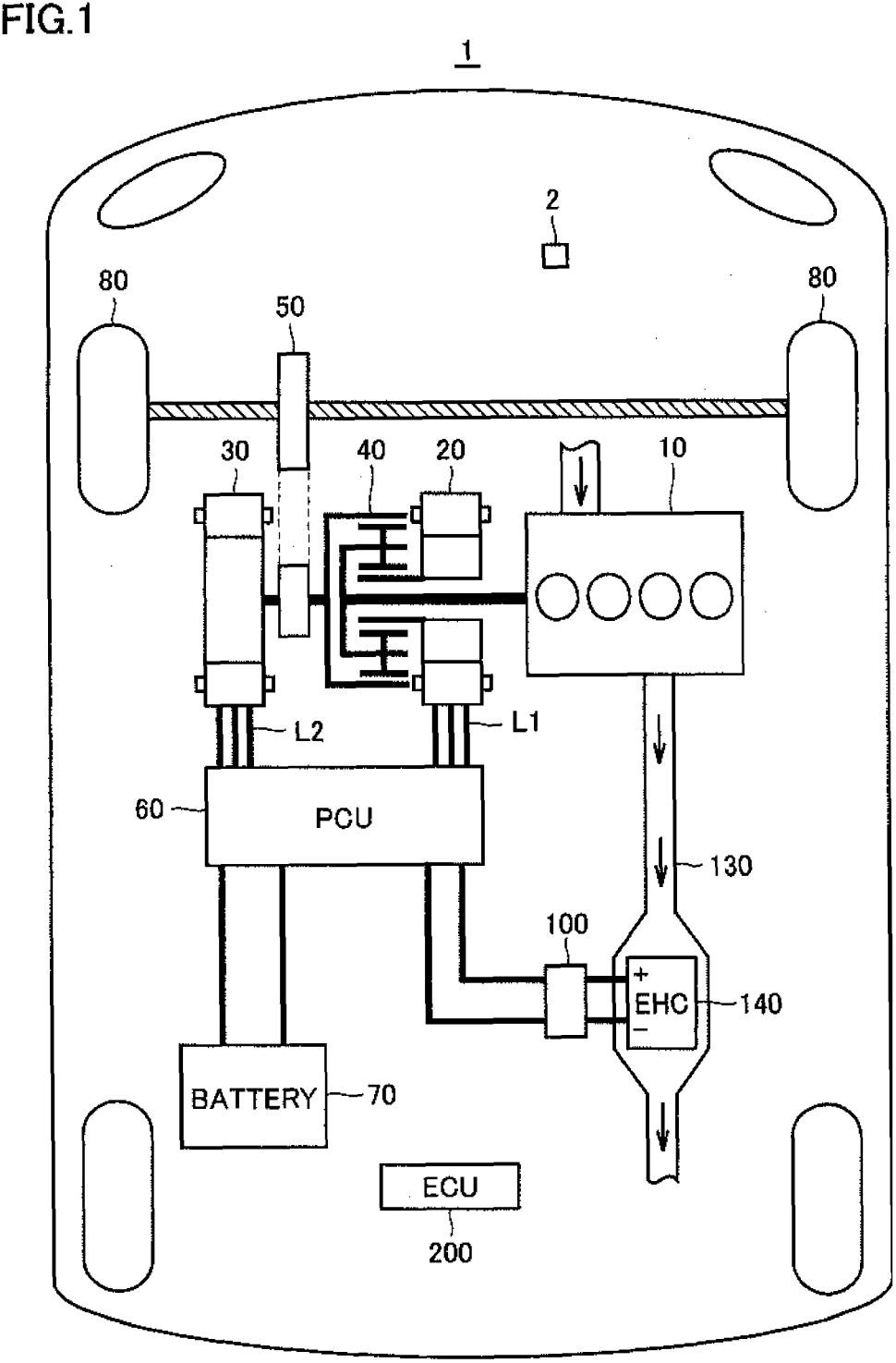
FIG. 1 represents an overall block diagram of a vehicle.

Hereinafter, an embodiment of the present invention will be described in detail with reference to the drawings. In the drawings, the same or corresponding parts have the same reference numerals allotted, and description thereof will not be repeated.

FIG. 1 represents an overall block diagram of a vehicle 1 according to the present embodiment. Vehicle 1 includes an engine 10, a first MG (Motor Generator) 20, a second MG 30, a motive power split device 40, a reducer 50, a power control unit (Power Control Unit, hereinafter referred to as "PCU") 60, a battery 70, drive wheels 80, and an electronic control unit (hereinafter referred to as "ECU") 200.

Engine 10 is an internal combustion engine generating a driving force for rotating a crank shaft with use of combustion energy generated at the time of combusting a mixture of air and fuel. First MG 20 and second MG 30 are motor generators driven with an alternate current.

Vehicle 1 runs with use of motive power outputted from at least one of engine 10 and second MG 30. A driving force generated by engine 10 is split into two paths by motive power split device 40. In other words, one path is for transmission to drive wheels 80 via reducer 50, and the other path is for transmission to first MG 20.

Motive power split device 40 is composed of planetary gears including a sun gear, a pinion gear, a carrier, and a ring gear. The pinion gear engages with the sun gear and the ring gear. The carrier rotatably supports the pinion gear and is coupled to a crankshaft of engine 10. The sun gear is coupled to a rotational shaft of first MG 20. The ring gear is coupled to a rotational shaft of second MG 30 and to reducer 50. As described, engine 10, first MG 20, and second MG 30 are coupled through motive power split device 40 composed of planetary gears, so that the rotational speed of engine 10 (hereinafter, referred to as "engine rotational speed Ne"), the rotational speed of first MG 20 (hereinafter, referred to as "first MG rotational speed Nm1"), and the rotational speed of second MG 30 (hereinafter, referred to as "second MG rotational speed Nm2") have a linear relationship in the collinear graph (refer to FIG. 3 which will be described later).

PCU 60 is controlled by control signals from ECU 200. PCU 60 converts direct-current power supplied from battery 70 into alternate-current power capable of driving first MG 20 and second MG 30. PCU 60 outputs the converted alternate-current power to first MG 20 and second MG 30 respectively. Accordingly, first MG 20 and second MG 30 are driven with use of power stored in battery 70. PCU 60 can also convert alternate-current power generated by first MG 20 and second MG 30 into direct-current power and charge battery 70 with use of the converted direct-current power.

Battery 70 is a direct-current power supply storing power for driving first MG 20 and second MG 30, and is composed of, for example, a rechargeable battery of nickel-metal hydride, lithium-ion, or the like. An output voltage of battery 70 is a high voltage of about 200V. In place of battery 70, a high-capacity capacitor is also employable.

Further, vehicle 1 includes a collision sensor 2. Collision sensor 2 detects acceleration G exerted to vehicle 1 as information for determining collision between vehicle 1 and other object (hereinafter, referred to as "vehicle collision"), and outputs a detection result to ECU 200.

Further, vehicle 1 includes an exhaust passage 130. Exhaust gas discharged from engine 10 is discharged to atmosphere through exhaust passage 130.

On exhaust passage 130, an electrical heated catalyst (hereinafter, referred to as "EHC") 140 is provided. EHC 140 is a catalyst configured to be able to electrically heat a catalyst by means of an electric heater (an electric resistor converting electric energy into heat energy). EHC 140 has a function of consuming a large amount of power to raise the temperature of the catalyst to a high temperature. Specifically, EHC 140 includes an electric heater generating heat by consuming power boosted by converter 61 (for example, direct-current power of about 650 volts), and raises the temperature of the catalyst to a high temperature by means of this electric heater. EHC of various known types may be employed as EHC 140.

ECU 200 includes a CPU (Central Processing Unit) and a memory not illustrated in the drawings, and is configured to execute predetermined arithmetic processing based on information stored in the memory.

Figure 2:
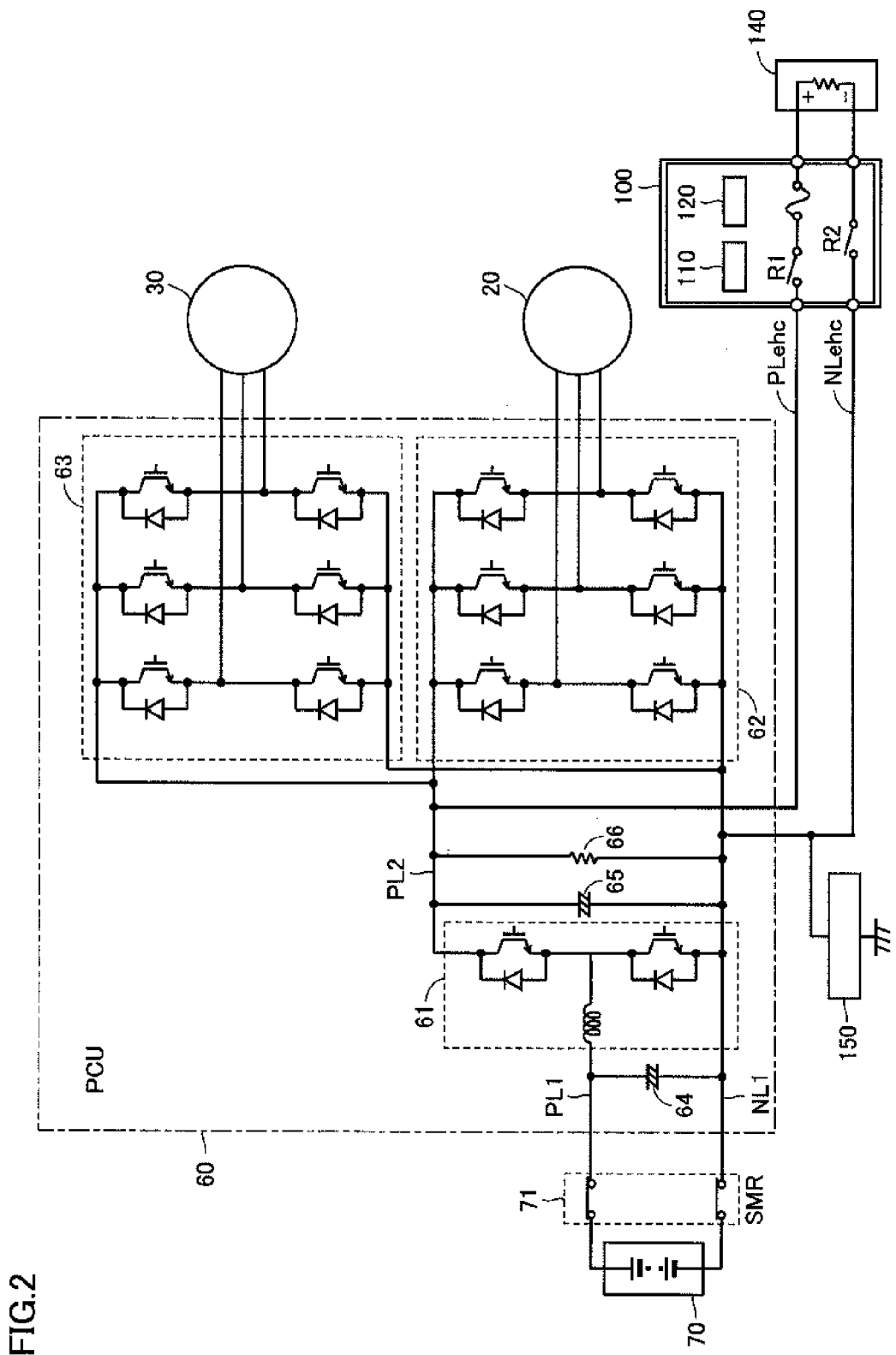
FIG. 2 represents a circuit configuration of a first MG, a second MG, a PCU, a battery, and an EHC.

FIG. 2 represents a circuit configuration of first MG 20, second MG 30, PCU 60, battery 70, and EHC 140.

Between PCU 60 and battery 70, a system main relay (SMR) 71 is provided. SMR 71 is controlled by control signals from ECU 200, and switches supply and shutoff of power between battery 70 and PCU 60. At the time of vehicle collision, ECU 200 controls SMR 71 to attain an opened state. Accordingly, at the time of vehicle collision, battery 70 is disconnected from PCU 60.

PCU 60 includes a converter 61, inverters 62, 63, smoothing capacitors 64, 65, and a discharge resistor 66.

Converter 61 is connected to battery 70 through a positive line PL1 and a negative line NL1. Further, converter 61 is connected to inverters 62, 63 through a positive line PL2 and negative line NL1.

Converter 61 includes a reactor, two switching elements, and two diodes. Converter 61 is controlled by control signals from ECU 200, and performs voltage conversion between battery 70 and inverters 62, 63.

Inverter 62 is provided between converter 61 and first MG 20. Inverter 63 is provided between converter 61 and second MG 30. Inverters 62, 63 are in parallel connection with converter 61 each other.

Each of inverters 62, 63 includes three-phase upper and lower arms (switching elements), and a diode connected in inverse-parallel with each switching element. The upper and lower arms of each of inverters 62, 63 are controlled by control signals from ECU 200, converts direct-current power undergone voltage conversion in converter 61 into alternate-current power, and outputs the same to first MG 20 and second MG 30 respectively.

Smoothing capacitor 64 is connected between positive line PL1 and negative line NL1 to smooth alternate-current component of voltage fluctuation between positive line PL1 and negative line NL1. Smoothing capacitor 65 is connected between positive line PL2 and negative line NL1 to smooth alternate-current component of voltage fluctuation between positive line PL2 and negative line NL1.

Discharge resistor 66 is connected between positive line PL2 and negative line NL1. Discharge resistor 66 is used for extracting residual electric load of smoothing capacitors 64, 65. Therefore, a capacity of discharge resistor 66 (the amount of power which can be consumed per unit time) is smaller as compared to EHC 140.

EHC 140 is connected to power lines (positive line PL2 and negative line NL1) between converter 61 and inverters 62, 63 inside of PCU 60. More specifically, EHC 140 has one end connected to a positive branch line PLehc branching out from positive line PL2, and the other end connected to a negative branch line NLehc branching out from negative line NL1.

EHC 140 includes an electric heater consuming power obtained after boosting power of battery 70 in converter 61 (for example, direct-current power of about 650 volts) to generate heat and is capable of consuming very high power. Further, EHC 140 is heated also by consuming power obtained after converting alternate-current power generated by first MG 20 or second MG 30 into direct-current power in inverter 62, 63.

Between EHC 140 and PCU 60, a switching device 100 is provided. Switching device 100 includes at its inside an EHC relay R1 provided on positive branch line PLehc, an EHC relay R2 provided on negative branch line NLehc, a backup power supply 110 storing operation power of EHC relays R1, R2 for emergencies, and a monitoring sensor 120 monitoring consumed power Pehc of EHC 140. On-off operation of each of EHC relays R1, R2 is controlled by control signals from ECU 200. Each of EHC relays R1, R2 can be operated with power supplied from at least one of an auxiliary machine battery (not illustrated) and backup power supply 110. Therefore, even when the power supply path from the auxiliary machine battery is shut off at the time of vehicle collision, operation of EHC relays R1, R2 can be secured with backup power supply 110.

Further, an electric leakage detector 150 is connected to negative branch line NLehc. Electric leakage detector 150 detects electric leakage on the energizing path connecting EHC 140 and PCU 60 (hereinafter referred to as "EHC electric leakage"). Various known types of electric leakage detectors may be employed as electric leakage detector 150.

During running of vehicle 1 having the structure described above, occurrence of vehicle collision causes rapid reduction in the vehicle speed. This rapid reduction of the vehicle speed in some cases may rotate first MG 20 to cause first MG 20 to generate a counter electromotive force.

Figure 3:
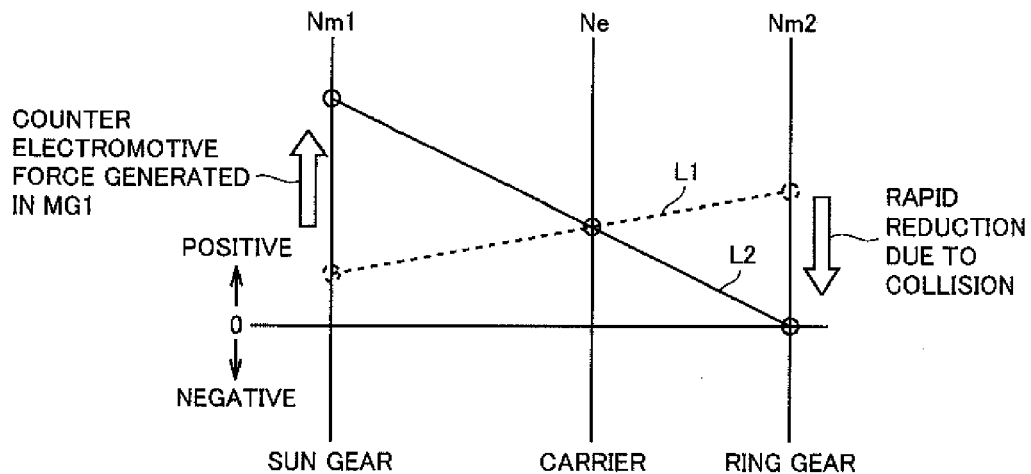
FIG. 3 represents changes in an engine rotational speed Ne, a first MG rotational speed Nm1, and a second MG rotational speed Nm2 depicted on a collinear graph.

FIG. 3 represents changes in engine rotational speed Ne, first MG rotational speed Nm1, and second MG rotational speed Nm2 at the time of vehicle collision depicted on a collinear graph.

As described above, engine rotational speed Ne, first MG rotational speed Nm1, and second MG rotational speed Nm2 have a linear relationship in the collinear graph. In other words, first MG rotational speed Nm1 is determined depending on engine rotational speed Ne and second MG rotational speed Nm2. Since second MG 30 is coupled to drive wheels 80 through reducer 50, second MG rotational speed Nm2 has a value proportional to the vehicle speed.

During forward running with use of motive power of engine 10 and second MG 30 (refer to collinear line L1), when vehicle collision occurs, the vehicle speed, in other words, second MG rotational speed Nm2 is rapidly reduced. At this time, engine 10 already rotating attempts to maintain the same rotational speed in accordance with the law of inertia. On the other hand, since ECU 200 controls SMR 71 to attain the opened state to shut off battery 70 from PCU 60 at the time of vehicle collision, first MG 20 cannot exert torque. Therefore, as indicated by the collinear line L2, at the time of vehicle collision, rapid reduction of second MG rotational speed Nm2 (collinear line L2 shown in FIG. 3 illustrates the case where the vehicle speed drops to zero in a moment) causes first MG rotational speed Nm1 to rapidly increase, so that first MG 20 generates a great counter electromotive force with a permanent magnet attached to first MG 20. Thus, it is desirable that the counter electromotive force generated in first MG 20 be consumed promptly at the time of vehicle collision.

However, since discharge resistor 66 is used for extracting residual electric load of smoothing capacitors 64, 65 and thus its capacity is relatively small, when discharge resistor 66 is used as equipment for consuming the counter electromotive force, the capacity runs short to promptly consume the counter electromotive force of first MG 20 for driving having a large capacity. Further, since it takes a considerable amount of time to raise the rotational speed of the air-conditioning motor to the rotational speed enabling consumption of the counter electromotive force generated in running first MG 20, when an air-conditioning motor (such as a compressor) is used as equipment for consuming the counter electromotive force, the counter electromotive force generated in running first MG 20 cannot be consumed promptly. Further, it is concerned that a capacity of the air-conditioning motor runs short.

Therefore, ECU 200 according to the present embodiment closes EHC relays R1, R2 at the time of vehicle collision to electrically connect EHC 140 and first MG 20, so that the counter electromotive force generated in first MG 20 is consumed by EHC 140 consuming large amount of power. This is the most prominent feature of the present invention.

Figure 4:
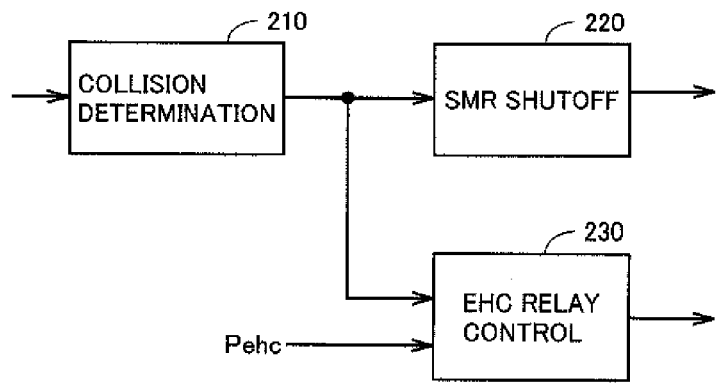
FIG. 4 represents a functional block diagram of an ECU.

FIG. 4 represents a functional block diagram of ECU 200, showing portions related to the control performed at the time of vehicle collision. ECU 200 includes a collision determining unit 210, an SMR shutoff unit 220, and an EHC relay controller 230.

Collision determining unit 210 determines whether or not vehicle collision has occurred based on a detection result of collision sensor 2, and outputs a determination result to SMR shutoff unit 220 and EHC relay controller 230.

When determined that the vehicle collision has occurred, SMR shutoff unit 220 opens SMR 71 to electrically separate battery 70 and PCU 60.

When determined that the vehicle collision has occurred, EHC relay controller 230 determines presence or absence of EHC electric leakage based on electric leakage detector 150. Then, when no EHC electric leakage is present, EHC relay controller 230 closes EHC relays R1, R2 to electrically connect EHC 140 and first MG 20.

Figure 5:
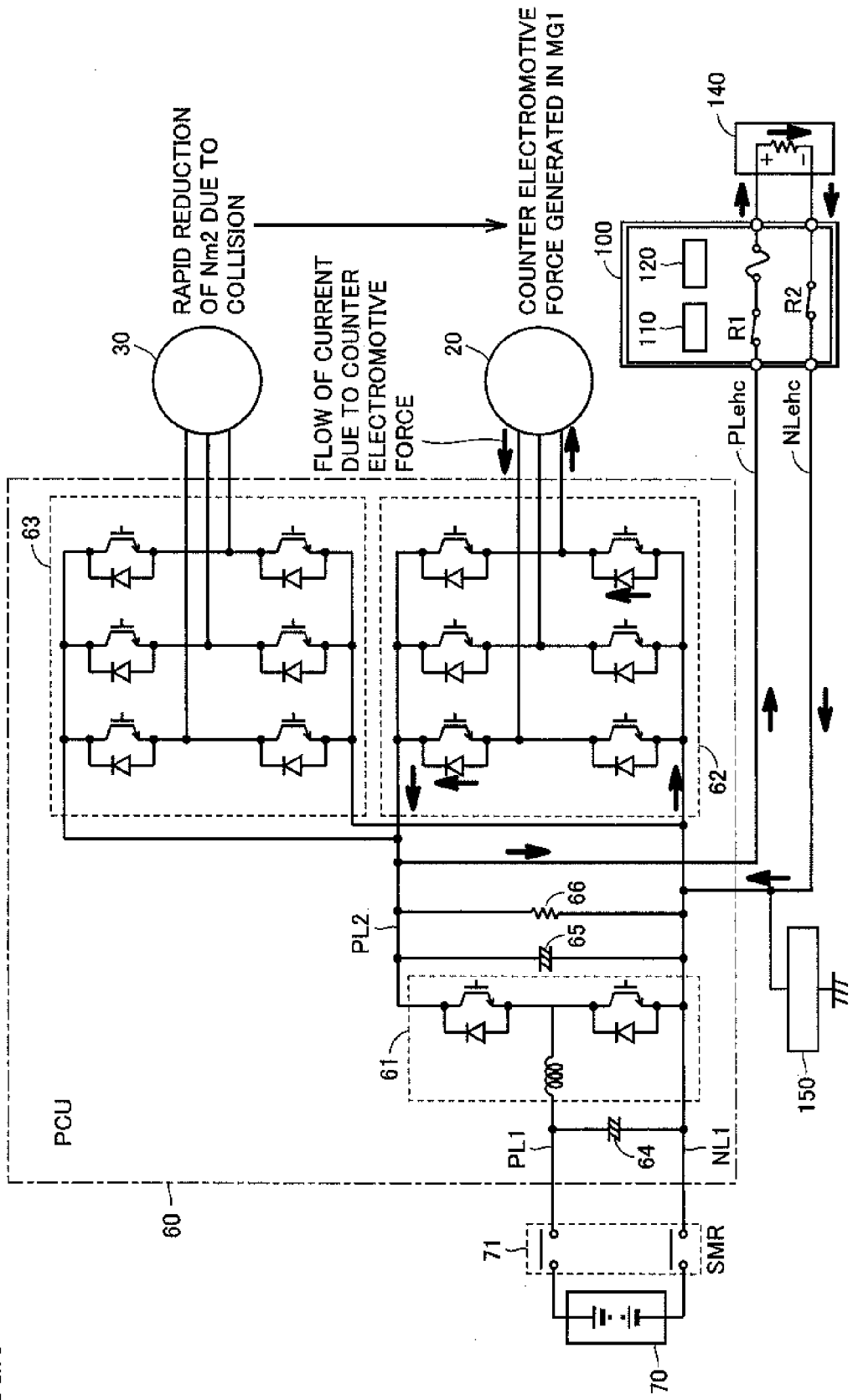
FIG. 5 represents a flow of current supplied to the EHC at the time of vehicle collision.

FIG. 5 represents a flow of current supplied to EHC 140 when EHC relays R1, R2 are closed at the time of vehicle collision. As described above, at the time of vehicle collision, rapid reduction of second MG rotational speed Nm2 forces first MG 20 to rotate, so that the counter electromotive force is generated at first MG 20.

As shown in FIG. 5, a current caused by the counter electromotive force passes through inverter 62 and then is supplied to EHC 140. Accordingly, the counter electromotive force generated in first MG 20 is consumed promptly at EHC 140. At this time, since the current caused by the counter electromotive force flows via the diode of inverter 62, it flows between first MG 20 and EHC 140 without operation of inverter 62. Further, in the present embodiment, EHC 140 is connected between converter 61 and inverter 62. Therefore, operation of converter 61 is not necessary. Thus, in the present embodiment, even when SMR 71 is shut off at the time of vehicle collision, or even when converter 61 and inverter 62 fall into an inoperative state due to influence of vehicle collision, the counter electromotive force generated in first MG 20 can be consumed at EHC 140.

Referring back to FIG. 4, after closing EHC relays R1, R2, EHC relay controller 230 accumulates EHC consumed power Pehc from monitoring sensor 120. When a cumulative value (accumulated value) of EHC consumed power Pehc exceeds a predetermined allowable value, EHC relay controller 230 opens EHC relays R1, R2 to electrically disconnect EHC 140 and first MG 20. Accordingly, while the counter electromotive force generated in first MG 20 is consumed at ECU 140 until first MG rotational speed Nm1 is lowered to some extent, EHC 140 and first MG 20 are electrically disconnected after the amount of power exceeding the allowable value is consumed at EHC 140, so that overvoltage and overheat of EHC 140 can be prevented.

Figure 6:
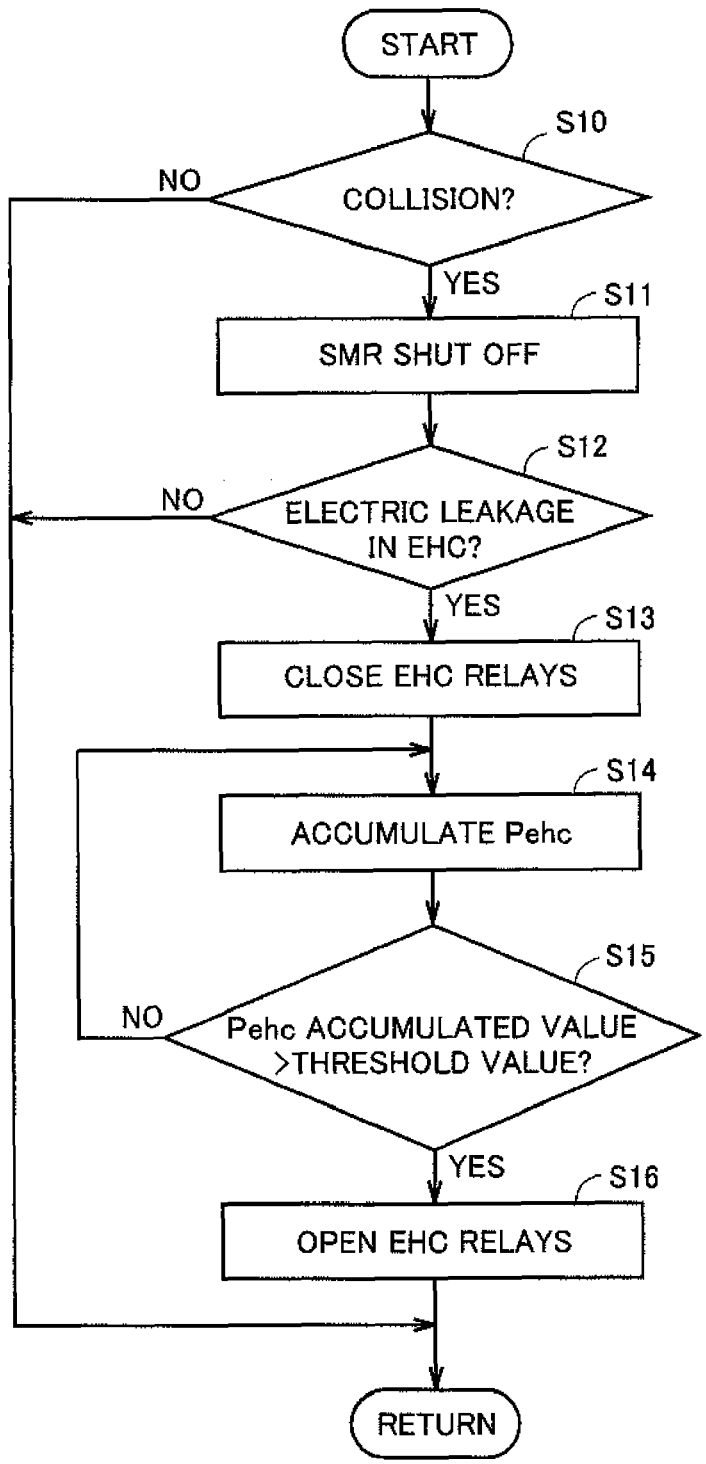
FIG. 6 is a flowchart representing process procedures of the ECU.

FIG. 6 is a flowchart representing process procedures of ECU 200 for achieving the functions described above. This flowchart is executed repeatedly at predetermined cycles during activation of ECU 200.

In step (hereinafter, the term "step" is abbreviated to "S"), ECU 200 determines presence or absence of vehicle collision. When no vehicle collision is present (NO in S10), this process is terminated.

When the vehicle collision is present (YES in S10), ECU 200 shuts off SMR 71 in S11.

In S12, ECU 200 determines presence or absence of EHC electric leakage. When EHC electric leakage is present (NO in S12), this process is terminated.

When no EHC electric leakage is present (YES in S12), ECU 200 closes EHC relays R1, R2 in S13. Accordingly, as described above, the counter electromotive force generated in first MG 20 is consumed at EHC 140.

In S14, ECU 200 accumulates EHC consumed power Pehc.

In S15, ECU 200 determines whether or not the cumulative value of EHC consumed power Pehc exceeds the allowable value. When the cumulative value of EHC consumed power Pehc does not exceed the allowable value (NO in S15), the process returns to S14, and accumulation of EHC consumed power Pehc is repeated.

When the cumulative value of EHC consumed power Pehc exceeds the allowable value (YES in S15), ECU 200 opens EHC relays R1, R2 in S16. Accordingly, overvoltage and overheat of EHC 140 are prevented.

As described above, in vehicle 1 according to the present embodiment, when vehicle collision has occurred, ECU 200 closes EHC relays R1, R2 to electrically connect first MG 20 to EHC 140 (electric resistor) capable of consuming a large amount of power. Accordingly, the counter electromotive force generated in first MG 20 at the time of vehicle collision can be consumed promptly at EHC 140.

It should be understood that the embodiments disclosed herein are illustrative and non-restrictive in every respect. The scope of the present invention is defined by the terms of claims, rather than the description of the embodiments set forth above, and is intended to include any modifications within the scope and meaning equivalent to the terms of claims.

REFERENCE SIGNS LIST 1 vehicle; 2 collision sensor; 10 engine; 20 first MG; 30 second MG; 40 motive power split device; 50 reducer; 60 PCU; 61 converter; 62, 63 inverter; 64, 65 smoothing capacitor; 66 discharge resistor; 70 battery; 71 SMR; 80 drive wheels; 100 switching device; 110 backup power supply; 120 monitoring sensor; 130 exhaust passage; 140 EHC; 150 electric leakage detector; 200 ECU; 210 collision determining unit; 220 shutoff unit; 230 relay controller; NL1 negative line; NLehc negative branch line; PL1, PL2 positive line; PLehc positive branch line; R1, R2 EHC relay.

The invention claimed is:

1. A vehicle comprising:
a rotational electric machine;
a power storage device configured to store power for driving said rotational electric machine;
an inverter configured to perform electric power conversion between said power storage device and said rotational electric machine;
an electric resistor electrically connected to between DC terminals of said inverter and configured to convert electric energy into heat energy;
a switching device including a switching circuit configured to switch an electric connection state between said electric resistor and said rotational electric machine; and
a control device controlling said switching circuit,
wherein said rotational electric machine generates a counter electromotive force with rotation caused by reduction of a rotational speed of wheels at the time of a vehicle collision,
wherein said control device is configured to control said switching circuit at the time of the vehicle collision to electrically connect said electric resistor and said rotational electric machine to allow said electric resistor to consume the counter electromotive force generated in said rotational electric machine at the time of the vehicle collision.

2. The vehicle according to claim 1, further comprising:
an engine; and
a converter performing voltage conversion between said electrical storage device and said inverter;
wherein said electric resistor is an electrically heatable catalyst device connected on a power line coupling said converter and said inverter to purify exhaust gas of said engine.

3. The vehicle according to claim 2, wherein when an accumulated value of consumed power of said catalyst device exceeds a threshold value after said rotational electric machine and said catalyst device are electrically connected, said control device controls said switching device to electrically disconnect said rotational electric machine and said catalyst device.

4. The vehicle according to claim 2, wherein when no electric leakage is present on an energizing path coupling said catalyst device and said rotational electric machine at the time of the vehicle collision, said control device controls said switching circuit to electrically connect said rotational electric machine and said catalyst device.

5. The vehicle according to claim 2, wherein said switching device includes at its inside a backup power supply storing operation power for said switching circuit.

6. The vehicle according to claim 2, further comprising:
a first motor generator;
a second motor generator rotating in conjunction with said wheels; and
a planetary gear device, wherein
said planetary gear device includes a sun gear, a ring gear coupled to said second motor generator, a pinion gear engaged with said sun gear and said ring gear, and a carrier coupled to said engine and rotatably supporting said pinion gear, and
said rotational electric machine is said first motor generator.

7. A method for controlling a vehicle, said vehicle including a rotational electric machine that generates a counter electromotive force with rotation caused by reduction of a rotational speed of wheels at the time of a vehicle collision, a power storage device configured to store power for driving said rotational electric machine, an inverter configured to perform electric power conversion between said power storage device and said rotational electric machine, an electric resistor electrically connected to between DC terminals of said inverter and configured to consume power, a switching device including a switching circuit configured to switch an electrical connection state between said electric resistor and said rotational electric machine, and a control device controlling said switching circuit, the method comprising the steps of:
determining whether or not the vehicle collision has occurred; and
allowing said electric resistor to consume the counter electromotive force generated in said rotational electric machine at the time of the vehicle collision by controlling said switching circuit to electrically connect said electric resistor and said rotational electric machine when determined that the vehicle collision has occurred.

\* \* \* \* \*